F. HARPER.
MOISTURE INDICATOR FOR CHURNS.
APPLICATION FILED MAY 24, 1919.

1,409,851.

Patented Mar. 14, 1922.

Inventor
Fred Harper,
By
Attorney

UNITED STATES PATENT OFFICE.

FRED HARPER, OF WATERTOWN, SOUTH DAKOTA.

MOISTURE INDICATOR FOR CHURNS.

1,409,851.  Specification of Letters Patent.  Patented Mar. 14, 1922.

Application filed May 24, 1919. Serial No. 299,513.

*To all whom it may concern:*

Be it known that FRED HARPER, a citizen of the United States of America, residing at Watertown, in the county of Codington and State of South Dakota, has invented new and useful Improvements in Moisture Indicators for Churns, of which the following is a specification.

The object of the invention is to provide a means for definitely indicating the moisture contents of butter by taking advantage of the well-known fact that the percentage of the water or moisture content is proportionate to the extent of the working incident to the desired incorporation of salt into the butter and therefore is denoted with sufficient accuracy by the number of strokes of the churn in the course of producing the required incorporation of salt, and with this object in view the invention consists in a construction and combination of parts disclosed in the accompanying drawings, it being understood that changes in form and proportion may be resorted to as may be required by special conditions and within the scope of the appended claim, without departing from the principle involved.

In the drawings:—

Figure 1:
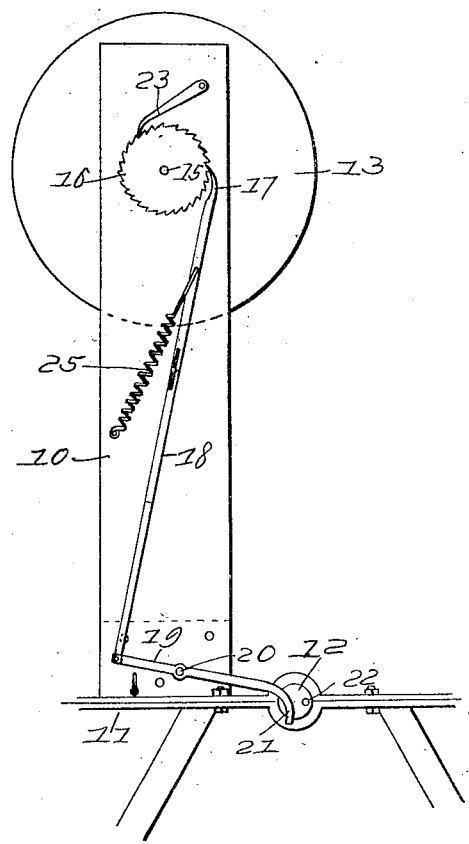
Figure 1 is a view of the indicator apparatus applied in the operative position to a churn.
Figure 2:
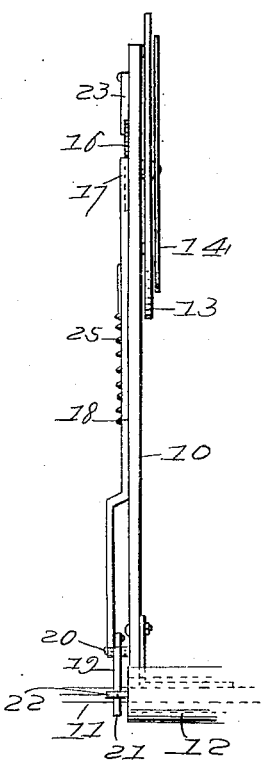
Figure 2 is an edge view of the same.
Figure 3:
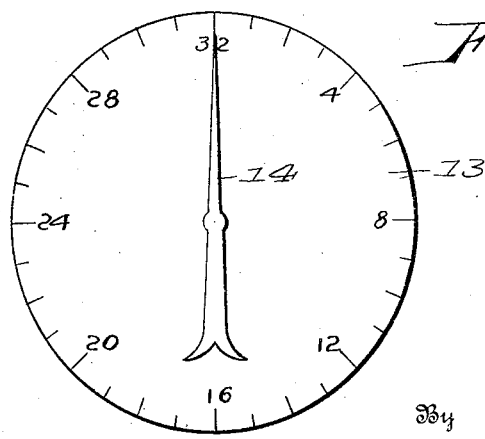
Figure 3 is a detail view of the indicator dial.

Upon a suitable standard 10 rising from the top of the churn structure 11 which supports the churn operating shaft 12, is mounted a dial 13 provided with a suitable scale of graduations and traversed by a pointer 14 of which the shaft 15 carries a ratchet wheel 16. In operative relation with the peripheral teeth of this ratchet wheel there is arranged an operating pawl 17 having a staff or pitman 18 connected with an arm of a tappet lever 19 fulcrumed as at 20, for example, to the standard, the other extremity of said lever having a cam face 21 arranged in the path of a tappet pin 22 carried by the churn shaft 12.

A retaining pawl 23 is also engaged with the ratchet wheel to prevent backward or retrogade movement thereof, and a spring 25 is connected with the operating pawl to return it to its normal position after each stroke of the lever caused by the tappet pin on the churn shaft.

In operation the number of revolutions of the churn shaft will be indicated by the progress of the pointer 14 over the dial and thus by comparison will indicate, in the process of working salt into the butter contents of the churn, the moisture content thereof for the guidance of the operator in determining the required extent of working in order to produce the intended result in so far as the ultimate condition of the product is concerned. Thus while heretofore the amount of working in the course of incorporating the salt has been a matter of guesswork approaching accuracy in proportion to the experience of the operator, the described apparatus enables the operator to determine definitely when the butter has been subjected to the required amount of working and thus eliminates the uncertainty of the former methods while providing for the operation of a churn during this portion of the butter making process without the use of skilled labor. The use of such apparatus moreover is conducive to substantial uniformity in the quality of the product in successive operations.

I claim:

In a device for the purpose indicated, the combination with an operating shaft provided on one end with an eccentrically disposed tappet pin, of an upright standard, a dial mounted at the upper extremity of the standard, a shaft rotatably mounted in the standard concentric with the dial and carrying a pointer on one extremity reading over the indications on the dial, a ratchet wheel carried on the other extremity of the shaft, a retaining pawl pivotally mounted on the standard and engaging the teeth of the ratchet wheel to preclude retrograde movement of the shaft and with it the pointer, a tappet lever fulcrumed on the standard and provided with a cam face engageable with the aforesaid tappet pin, a pitman having one end pivotally connected to the end of the tappet lever remote from the cam face, the pitman having its upper extremity terminating in a pawl engaging the teeth of the ratchet wheel, and a spring yieldingly impelling the pitman in the direction of the ratchet wheel for the purpose specified.

In testimony whereof he affixes his signature.

FRED HARPER.